Sept. 15, 1931.  E. O. HOLMBERG  1,823,044
SPEEDOMETER
Filed Aug. 1, 1929  3 Sheets-Sheet 1

INVENTOR.
Einar O. Holmberg
BY
Morsell, Keeney, & Morsell
ATTORNEYS.

Sept. 15, 1931.   E. O. HOLMBERG   1,823,044
SPEEDOMETER
Filed Aug. 1, 1929   3 Sheets-Sheet 2

INVENTOR.
Einar O. Holmberg
BY
Morsell, Kenney, & Morsell
ATTORNEYS.

Sept. 15, 1931.  E. O. HOLMBERG  1,823,044
SPEEDOMETER
Filed Aug. 1, 1929   3 Sheets-Sheet 3

INVENTOR.
Einar O. Holmberg
BY
Morsell, Keeney & Morsell
ATTORNEYS

Patented Sept. 15, 1931

1,823,044

UNITED STATES PATENT OFFICE

EINAR O. HOLMBERG, OF WAUWATOSA, WISCONSIN

SPEEDOMETER

Application filed August 1, 1929. Serial No. 382,728.

This invention relates to improvements in speedometers.

Heretofore, aeroplanes have been provided with instruments capable of indicating only the air speed of the vehicle and not the speed of travel relative to the ground. With this type of instrument, it was therefore necessary to take into consideration the velocity of the wind and to either add or subtract this item from the speed recorded. For this reason calculations of ground speed were largely guesswork.

It is one of the objects of this invention to provide an improved speedometer, which, although more particularly adapted for use in connection with aeroplanes, is also capable of use in land or water vehicles, the speedometer being so constructed as to record the true ground speed.

A further object of this invention is to provide a device of the class described in which an active mass is employed which is arranged to be acted upon by inertia during a change of velocity of the vehicle.

It is a further object of this invention to provide an improved speedometer in which the movement of the active mass caused by inertia is transmitted to a velocity indicating member in a novel manner.

A further object of this invention is to provide a speedometer having a housing which is so suspended in the vehicle that the accuracy of the instrument will not be affected by the various positions or angles out of a horizontal plane which the aeroplane may assume during its travel.

It is a further object of this invention to provide means in combination with the velocity indicator for recording the total distance traveled.

With the above and other objects in view, the invention consists of the improved speedometer, and all its parts and combinations, as set forth in the claims, and all equivalents thereof.

In the accompanying drawings, in which the same reference numerals designate the same parts in all of the views.

Figure 1:
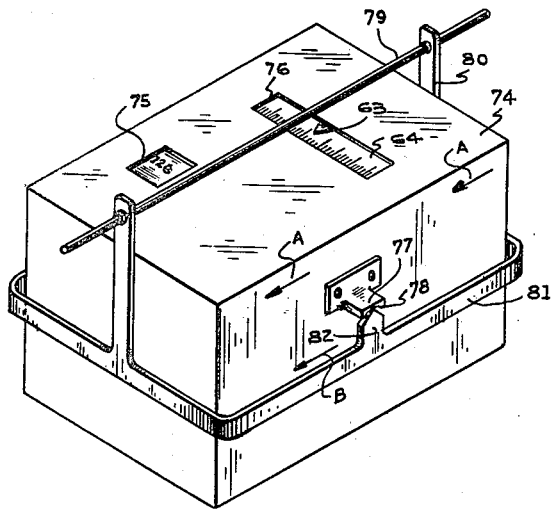
Fig. 1 is a perspective view of the speedometer housing showing the manner of suspension.
Figure 5:
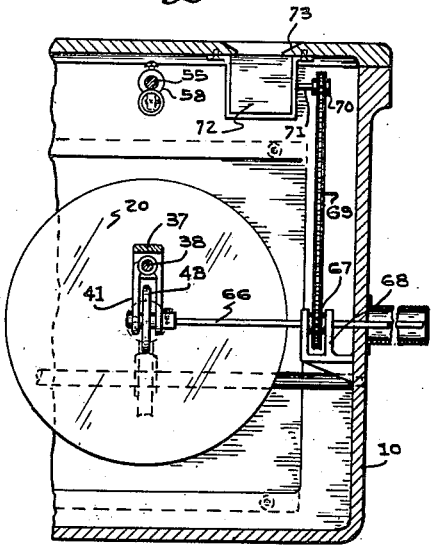
Fig. 5 is a vertical sectional view taken on line 5—5 of Fig. 2, part being broken away.
Figure 4:
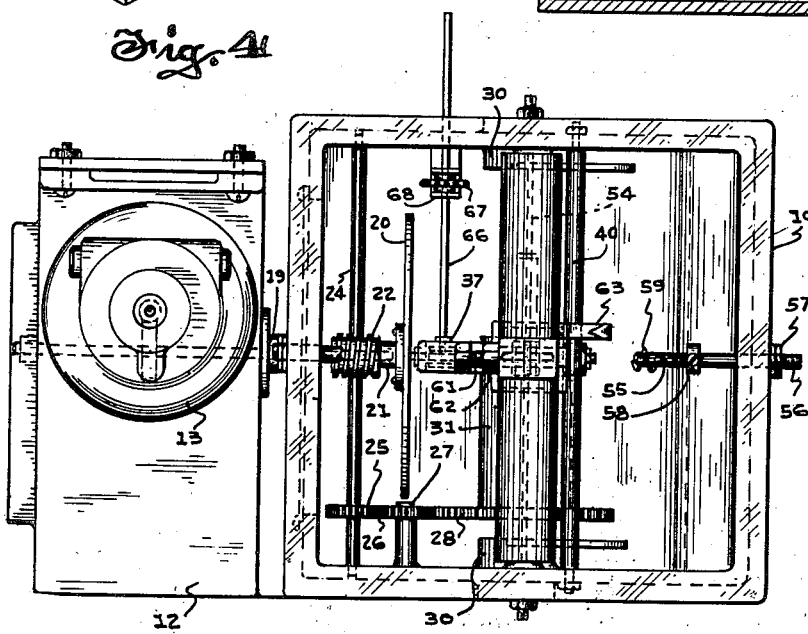
Fig. 4 is a view taken on line 4—4 of Fig. 2.

Referring to the drawings, the numeral 10 designates a casing having a lower laterally extending portion 11 on which a housing 12 is mounted. Positioned above the housing 12 is a motor 13, the said motor having a drive shaft 14 depending therefrom within the housing 12. The lower end of said drive shaft is connected with a speed regulating unit 15, the latter being of the usual construction, and being adapted to maintain the motor 13 at a constant speed.

A worm 16, rigidly mounted on the shaft meshes with a worm gear 17 mounted rigidly on a shaft 18, the latter shaft being journaled horizontally through the housing 12 and having its inner end journaled in and projecting from a sleeve 19, said sleeve 19 extending within the casing 10. The extreme inner end of the shaft 18 rigidly carries a disk 20, and rigidly positioned on said shaft between the hub portion 21 of said disk and the end of the sleeve 19 is a worm 22.

The worm 22 meshes with a worm gear 23, the latter being rigidly mounted on a shaft 24 which is journaled horizontally through the casing 10. A gear 25 is also rigidly mounted on the shaft 24, the said gear meshing with a gear 26 mounted on a short shaft 27. The latter gear in turn meshes with a gear 28 which is rigidly mounted on a shaft 29. The shaft 29 is mounted in bearings 30 of the casing. Also rigidly mounted on the shaft 29 is a roller 31.

A traveling member or carriage 32 having an opening 33 therein has a depending arm 34, the lower portion of which is tubular as at 35. The said tubular portion surrounds a horizontal rod 36 and is adapted to slide along the same. The carriage is also provided with an extension 37, and a rod 38 extends through said extension and through the carriage. One end of said rod carries a roller 39 which engages a guide rod 40, the latter extending horizontally through the casing. Near the other end of the rod, and within the extension 37 is a depending bifurcated member 41, the said bifurcated member having a swivel connection with the rod 38. A spring 42, surrounding the rod is positioned between said bifurcated member 41 and the side of the carriage. A wheel 43 is rotatably carried in the lower end of said bifurcated member, and said wheel engages the disk 20.

Mounted within the carriage 32 on pivot pins 44 is a member 45 having a bifurcated lower end 46. A wheel 47, which engages the roller 31 is rotatably mounted in said bifurcated lower end. Secured to the upper end of the member 45 is the inner end of an arm 48; the said arm extending through the open portion of the carriage and having its outer end portion upwardly bent as at 49.

A shaft 50, in the lower portion of the casing has each end mounted on knife edge bearings 51. Rigidly secured to said shaft, and extending upwardly therefrom are arms 52 which are curved to extend around the roller 31. The upper ends of said arms are secured to a weight or mass 53, the latter having a lower groove 54, within which the outer end of the arm 48 extends. Extending through the casing at right angles to and above the mass 53 is a rod 55 having threaded end portions 56. By turning nuts 57, which are threaded on the ends of the rod, the latter may be laterally adjusted. Collars 58, which are secured in spaced apart relation on the rod 55 have springs 59 connected thereto. The said springs are also connected to a lug 60 on the upper portion of the mass 53. A bolt 61 is threaded transversely through the mass 53 and is provided with a lock nut 62. By threading said bolt in or out, the balance of the mass may be changed.

An indicating arm 63 extends upwardly from the carriage and is adapted in connection with a dial 64 to register movement of said carriage. The casing 10 is provided with an opening 65 above the dial.

A square shaft 66, has one end connected to the wheel 43 by means of a universal joint and extends through a square opening in the hub of a sprocket wheel 67, the said hub portion being rotatable in a bearing 68. An endless chain 69 connects the sprocket wheel 67 with a sprocket wheel 70 mounted on the drive shaft 71 of a counting device 72, the latter being of common construction. The casing 10 is provided with an opening 73 above the counting device so that the latter may be read.

Figure 2:
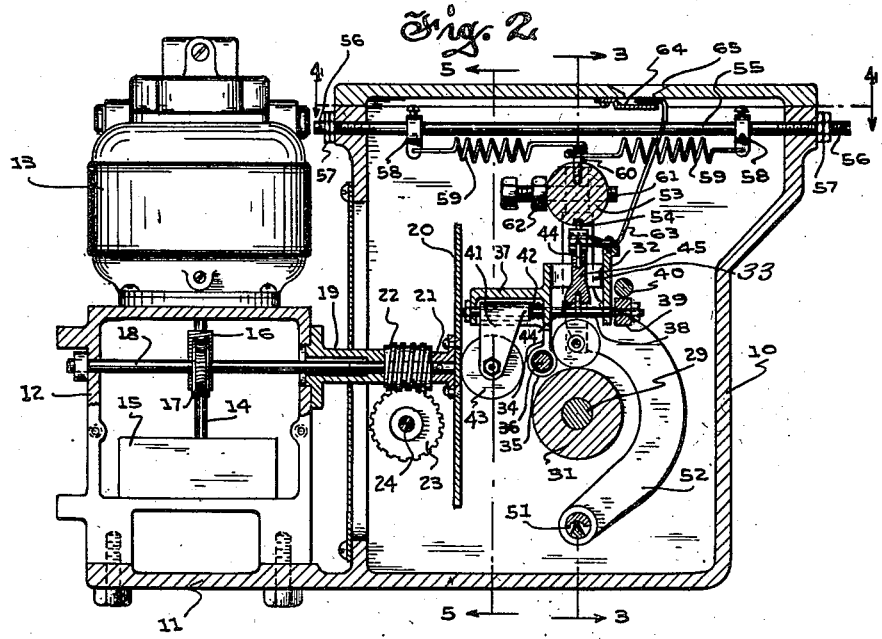
Fig. 2 is a vertical sectional view of the interior mechanism.
Figure 3:
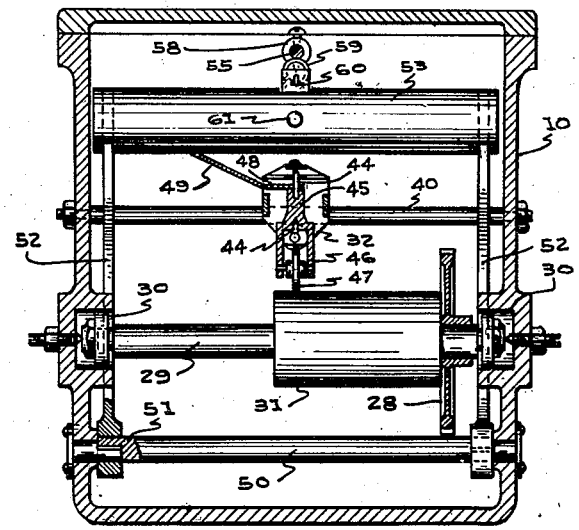
Fig. 3 is a sectional view taken on line 3—3 of Fig. 2.

The entire interior mechanism shown in Fig. 2 is mounted in a suitable manner in an outer casing 74 (see Fig. 1). The said casing is provided with an opening 75 above the counting device and with an opening 76 above the dial 64. Lugs 77, having V-shaped grooves 78 cut in their lower sides project from opposite sides of the casing 74. A rod 79, which is adapted to be secured in the vehicle, has arms 80 of a frame 81, pivoted thereon. The frame 81 has pointed lugs 82 extending from opposite sides thereof and engaging the grooves 78 in the lugs 77 of the casing to form knife-edge bearings.

The operation of this device is as follows:

The constant speed motor 13 is wired to a suitable source of electricity within the vehicle and is caused to operate whenever the vehicle is moving. Operation of the motor, through the gearing above described will cause rotation of the roller 31 and disk 20 at a constant speed. When the vehicle is accelerated, inertia will act upon the mass 53 and will cause the same to move against the tension of the springs 59 in a direction opposite to the direction of travel of the vehicle. This movement of the mass 53 by inertia will occur, in accordance with the laws of physics, only when the mass is compelled by movement of the vehicle to change its condition of rest or of uniform motion in a straight line. Movement of the mass 53 will cause the arm 48, which engages the groove 54 in the mass to be turned, and this will cause pivoting of the member 45 within the carriage 32.

Pivoting of the carriage will cause the wheel 47 to be turned at an angle on the roller 31, and when the wheel is so turned it will start to travel longitudinally of the roller and will cause the carriage to be moved along its guide rods. Movement of the carriage will, in turn cause movement of the indicating arm 63 along the dial 64.

When the acceleration of the vehicle has ceased, and it is once more traveling at constant speed, inertia will no longer act upon the mass 53 and the latter will be returned by the springs 59 to its normal position. The carriage and wheel 47 however, will remain in their last position as will the indicator 63, which will record on the dial 64 the highest speed attained during the period of acceleration. If the vehicle is again accelerated, the device will act in a similar manner and the indicator will record the highest speed attained during the second acceleration.

If the vehicle is decelerated, the device will act in just the opposite manner and the wheel 47 will be moved in the opposite direction on the roller 31 or back toward its original position. This will also retard the indicator 63 and the latter will record the speed attained during the period of deceleration.

The total number of miles traveled by the vehicle is recorded by the counting device 72.

The latter is operated through the wheel 43 and disk 20. When the vehicle is at rest, the wheel 43 will be positioned exactly in the center of the rotating disk 20, and in such position will not be rotated thereby. However, as soon as the vehicle is set in motion, and the carriage 32 is moved by the force of acceleration, the wheel 43 will be moved away from the center of the disk 20 and will be revolved. Lateral movement of the wheel 43 is permitted by the square shaft 66 which slides in the hub of the sprocket wheel 67. The rotation of the wheel 43 will cause rotation of the square shaft and, through the sprocket wheels 67 and 70 and the endless chain 69, operation of the counting device 72. The greater the speed at which the vehicle is traveling, the farther from the center of the disk 20 the wheel 43 will be, and accordingly the greater the speed at which said wheel will be rotated. This will of course cause recording of greater mileage in a given period by the counting device. When the vehicle is decelerated, the wheel 43 will be brought nearer the center of the disk 20 and the counting device will be accordingly retarded in its operation.

The device is suspended on two sets of pivots as indicated in Fig. 1. Thus, the accuracy of the instrument will not be affected by the various changes in position or in angle of travel of the aeroplane. When the device is so suspended it is necessary to equalize the force of acceleration action upon the casing 74 as said force would tend to cause tilting of the casing during periods of acceleration and deceleration. Accordingly, the lugs 77 are positioned considerably above the center of gravity of the casing. During a period of acceleration, inertia will act on the mass within the device so as to cause increased tension of the springs 59. This will act on the wall of the casing 74 and will tend to swing it in the direction of arrows A. At the same time however, the force of acceleration acting upon the casing 74 itself will act at the center of gravity which is below the point of suspension and will tend to swing the casing in the direction of the arrow B. Thus the two forces A and B on opposite sides of the point of suspension will tend to equalize one another and the casing will accordingly be maintained in a position to assure accuracy of the device at all times.

Figure 6:
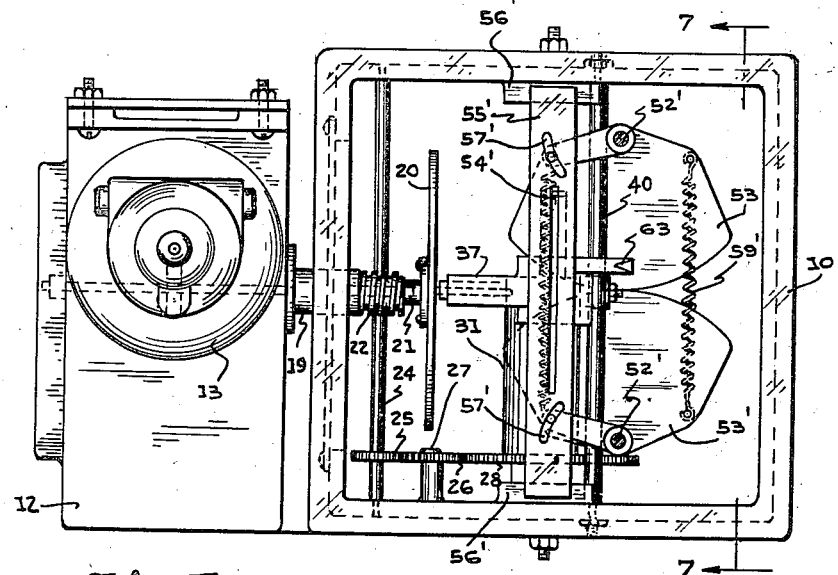
Fig. 6 is a view similar to Fig. 4 showing a modified form of the device.
Figure 7:
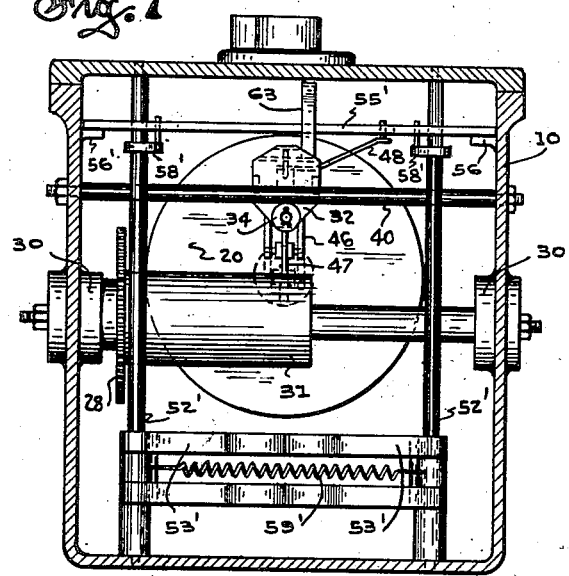
Fig. 7 is a sectional view taken on line 7—7 of Fig. 6.

In the modified form illustrated in Figs. 6 and 7, the construction is similar to that in the principal form, except that a different type of mass is employed. In this form, pairs of weights 53′ are substituted for the mass 53, the said weights being rigidly secured to the lower ends of rods 52′ and being normally held in inactive position by springs 59′. A bar 55′ resting on lugs 56′ is provided with arcuate slots 57′ and with a longitudinal slot 54′. The arcuate slots 57′ are engaged by pins extending from members 58′ which are eccentrically mounted on the rods 52′. In a manner similar to that in the principal form, the weights 53′ are acted upon by inertia, causing the rods 52′ to be turned. Through the pins of the eccentric members 58′, which engage the arcuate slots 57′, the bar 55′ is moved laterally along the lugs 56′. This will cause the arm 48, which is identical to that used in the principal form to be turned, with a resulting pivotal movement of the wheel 47 of the carriage 32. The remainder of the operation is the same as above described in connection with the principal form. A counting device similar to that in the principal form may be employed in the modified construction.

Although only one modification has been shown and described, it is obvious that other changes may be made without departing from the spirit of the invention and it is to be understood that all such changes and modifications are contemplated as may come within the scope of the claims.

What I claim is:

1. A speedometer comprising a mass adapted to be displaced by changes in acceleration, a traveling member, means for moving said traveling member, a mechanical connection between said traveling member and said mass for bringing the traveling member into operative relation with said moving means upon displacement of the mass, and velocity indicating means in connection with said traveling member.

2. A speedometer comprising a mass adapted to be displaced by changes in acceleration, a traveling member, rotatable roller means for moving said traveling member, a mechanical connection between said traveling member and said mass for bringing the traveling member into operative relation with said rotatable roller means upon displacement of the mass, and velocity indicating means in connection with said traveling member.

3. A speedometer comprising a mass adapted to be displaced by changes in acceleration, a traveling member, a rotatable member pivotally carried by said traveling member, a second rotatable member engaging said first rotatable member, means for driving said second rotatable member, means between said mass and said first rotatable member for causing pivotal movement of the latter upon displacement of the mass, said first rotatable member when pivoted being moved longitudinally of the second rotatable member, and velocity indicating means in connection with said traveling member.

4. A speedometer comprising a mass adapted to be displaced by changes in acceleration, velocity indicating means, and translating mechanism between said mass and said indicating means, said translating mechanism including a pair of rotatable members engaging one another and having axes which are normally parallel to one another, and means responsive to the displacement of said mass for causing movement of one of said rotatable members so that its axis is moved out of parallelism with the axis of the other rotatable member whereby said first rotatable member is caused to travel when said second rotatable member is rotated.

5. A speedometer comprising a mass adapted to be displaced by changes in acceleration, velocity indicating means, and translating mechanism between said mass and said indicating means, said translating mechanism including a rotatable roller, a slidably mounted carriage, a wheel pivotally carried by said carriage and having its axis normally parallel to the axis of the roller, and means responsive to the displacement of said mass for causing pivotal movement of said wheel so that its axis is moved out of parallelism with the axis of the roller whereby said wheel and carriage is caused to travel when said roller is rotated.

6. A speedometer comprising a mass adapted to be displaced by changes in acceleration, velocity indicating means, and translating mechanism between said mass and said indicating means, said translating mechanism including a rotatable roller, a slidably mounted carriage, a wheel pivotally carried by said carriage and having its axis normally parallel to the axis of the roller, and an arm connected between said mass and said wheel for causing pivotal movement of the latter upon displacement of the mass so that the axis of the wheel is moved out of parallelism with the axis of the roller whereby said wheel and carriage are caused to travel when the roller is rotated.

7. A speedometer comprising a pivotally mounted arm, a mass carried by said arm and adapted to be displaced by changes in acceleration, said mass having a groove therein, a traveling member, a rotatable member pivotally carried by said traveling member, a second rotatable member engaging said first rotatable member, means for driving said second rotatable member, an arm having one end engageable with the groove of said mass and having its other end connected with said first rotatable member for causing pivotal movement of the latter upon displacement of the mass, said first rotatable member when pivoted being moved longitudinally of the second rotatable member, and velocity indicating means in connection with said traveling member.

8. A speedometer comprising a pair of pivotally mounted masses adapted to be displaced by changes in acceleration, yielding means connected between said masses for normally holding the same in neutral position, a slidably mounted bar having a slot therein, means between said masses and said bar for causing movement of the latter upon displacement of said masses, a traveling member, a rotatable member pivotally carried by said traveling member, a second rotatable member engaging said first rotatable member, means for driving said second rotatable member, an arm having one end engageable with the slot of said slidable bar and having its other end connected with said first rotatable member for causing pivotal movement of the latter upon displacement of the mass, said first rotatable member when pivoted being moved longitudinally of the second rotatable member, and velocity indicating means in connection with said traveling member.

9. A speedometer comprising a pair of pivotally mounted spaced apart rods, a mass adapted to be displaced by changes in acceleration secured to each rod, yielding means connected between said masses for normally holding the same in neutral position, an arm secured to each rod, a slidably mounted bar having a pair of arcuate slots and having a longitudinal slot therein, means carried by the arms on the rods engageable with the arcuate slots for causing movement of said bar upon displacement of the masses, a traveling member, a rotatable member pivotally carried by said traveling member, a second rotatable member engaging said first rotatable member, means for driving said second rotatable member, an arm having one end engageable with the longitudinal slot of said slidable bar and having its other end connected with said first rotatable member for causing pivotal movement of the latter upon displacement of the masses, said first rotatable member when pivoted being moved longitudinally of the second rotatable member, and velocity indicating means in connection with said traveling member.

In testimony whereof, I affix my signature.

EINAR O. HOLMBERG.